United States Patent [19]

Sanpei

[11] Patent Number: 5,396,291
[45] Date of Patent: Mar. 7, 1995

[54] PICTURE SIGNAL PROCESSING SYSTEM HAVING IMPROVED QUANTIZER

[75] Inventor: Tatsuya Sanpei, Tokyo, Japan
[73] Assignee: NEC Corporation, Tokyo, Japan
[21] Appl. No.: 168,761
[22] Filed: Dec. 16, 1993
[30] Foreign Application Priority Data
  Dec. 16, 1992 [JP] Japan .................. 4-335770
[51] Int. Cl.$^6$ ........................... H04N 7/133
[52] U.S. Cl. ..................... 348/405; 348/403
[58] Field of Search .......... 348/405, 419, 403

[56] References Cited

U.S. PATENT DOCUMENTS 4,831,636 5/1989 Taniguchi et al. .......... 348/405

FOREIGN PATENT DOCUMENTS 2-132972 5/1990 Japan .

*Primary Examiner*—Tommy P. Chin
*Assistant Examiner*—A. Au
*Attorney, Agent, or Firm*—Whitham, Curtis, Whitham & McGinn

[57] ABSTRACT

A picture signal processing system includes an orthogonal transformer which performs an orthogonal transformation upon a group of picture signals to generate transformed coefficients G. A quantizer divides each of the transformed coefficients G by a quantization factor C determined by $$C = \frac{1}{(1 + S \cdot 2^A) \cdot 2^B}$$

where A and B are integers, and S is a sign. The quantizer generates a quantization coefficient G/C for each of the transformed coefficients G. Then, an encoder encodes each of the quantization coefficients G/C to generate compressed signals of the picture signals.

8 Claims, 11 Drawing Sheets

| n \ m | 0 | 1 | 2 | 3 | 4 | 5 | 6 | 7 |
|---|---|---|---|---|---|---|---|---|
| 0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 14 | 22 | 29 | 51 | 87 | 80 | 62 |
| 4 | 18 | 22 | 37 | 56 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |

C(m,n)

| n\m | 0 | 1 | 2 | 3 | 4 | 5 | 6 | 7 |
|---|---|---|---|---|---|---|---|---|
| 0 | 4 | 3 | 3 | 4 | 5 | 5 | 6 | 6 |
| 1 | 3 | 3 | 3 | 4 | 5 | 6 | 6 | 6 |
| 2 | 4 | 3 | 4 | 4 | 5 | 6 | 6 | 6 |
| 3 | 4 | 4 | 4 | 5 | 6 | 7 | 6 | 6 |
| 4 | 4 | 4 | 5 | 6 | 6 | 7 | 7 | 6 |
| 5 | 5 | 5 | 6 | 6 | 6 | 7 | 7 | 6 |
| 6 | 5 | 6 | 6 | 6 | 7 | 7 | 7 | 7 |
| 7 | 6 | 6 | 7 | 7 | 7 | 7 | 7 | 7 |

$C'(m,n)$

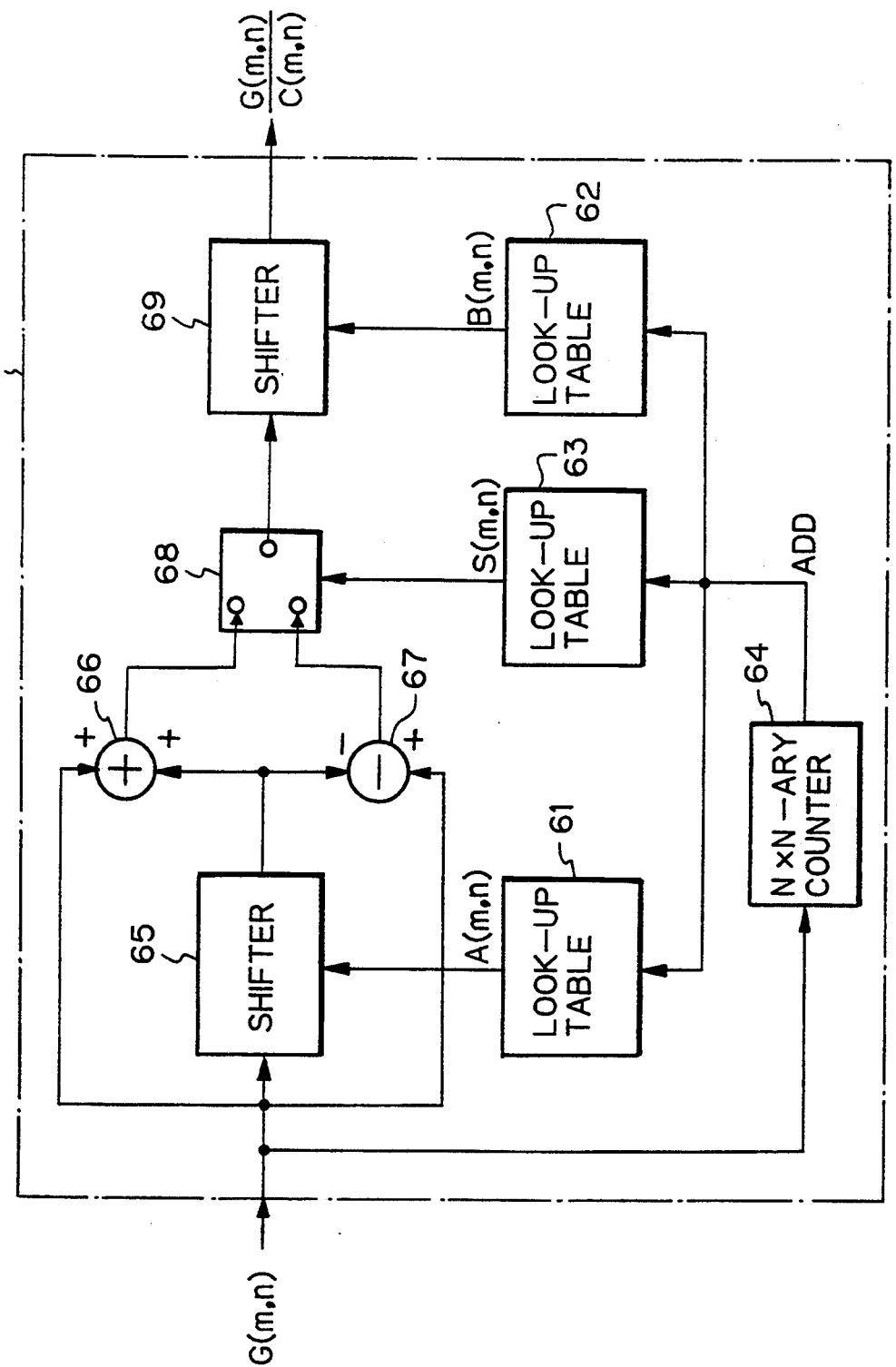

Fig. 8A

| n \ m | 0 | 1 | 2 | 3 | 4 | 5 | 6 | 7 |
|---|---|---|---|---|---|---|---|---|
| | | | | A (m,n) | | | | |
| 0 | 0 | -1 | -1 | 0 | -2 | -1 | -2 | -4 |
| 1 | -2 | -2 | -3 | -3 | -2 | -3 | -4 | -3 |
| 2 | -3 | -2 | 0 | -2 | -1 | -3 | -4 | -3 |
| 3 | -3 | -4 | -1 | -3 | -2 | -1 | -1 | -5 |
| 4 | -3 | -1 | -3 | -3 | -4 | -3 | -2 | -3 |
| 5 | -2 | -4 | -3 | 0 | -1 | -2 | -3 | -1 |
| 6 | -2 | 0 | -3 | -1 | -2 | -4 | -4 | -2 |
| 7 | -3 | -1 | -2 | -2 | -3 | -2 | -2 | -2 |

Fig. 8B

| n \ m | 0 | 1 | 2 | 3 | 4 | 5 | 6 | 7 |
|---|---|---|---|---|---|---|---|---|
| | | | | B (m,n) | | | | |
| 0 | -5 | -4 | -4 | -5 | -5 | -6 | -6 | -6 |
| 1 | -4 | -4 | -4 | -4 | -5 | -6 | -6 | -6 |
| 2 | -4 | -4 | -5 | -5 | -6 | -6 | -6 | -6 |
| 3 | -4 | -4 | -5 | -5 | -6 | -7 | -7 | -6 |
| 4 | -4 | -5 | -5 | -6 | -6 | -7 | -7 | -6 |
| 5 | -5 | -5 | -6 | -7 | -7 | -7 | -7 | -7 |
| 6 | -6 | -7 | -8 | -7 | -7 | -7 | -7 | -7 |
| 7 | -6 | -7 | -7 | -7 | -7 | -7 | -7 | -7 |

| n \ m | 0 | 1 | 2 | 3 | 4 | 5 | 6 | 7 |
|---|---|---|---|---|---|---|---|---|
| 0 | + | + | + | + | + | + | + | + |
| 1 | + | + | + | − | + | + | + | + |
| 2 | + | + | + | + | + | + | − | + |
| 3 | + | − | + | + | + | + | + | + |
| 4 | − | + | − | + | − | + | + | − |
| 5 | + | − | + | + | + | + | + | + |
| 6 | + | + | − | + | + | + | + | + |
| 7 | − | + | + | + | + | + | + | + |

| n \ m | 0 | 1 | 2 | 3 | 4 | 5 | 6 | 7 |
|---|---|---|---|---|---|---|---|---|
| 0 | 16.0 | 10.7 | 10.7 | 16.0 | 25.6 | 42.7 | 51.2 | 60.2 |
| 1 | 12.8 | 12.8 | 14.2 | 18.3 | 25.6 | 56.9 | 60.2 | 56.9 |
| 2 | 14.2 | 12.8 | 16.0 | 25.6 | 42.7 | 56.9 | 68.3 | 56.9 |
| 3 | 14.2 | 17.1 | 21.3 | 28.4 | 51.2 | 85.3 | 85.3 | 62.1 |
| 4 | 18.3 | 21.3 | 36.6 | 56.9 | 68.3 | 113.8 | 102.4 | 73.1 |
| 5 | 25.6 | 34.1 | 56.9 | 64.0 | 85.3 | 102.4 | 113.8 | 85.3 |
| 6 | 51.2 | 64.0 | 73.1 | 85.3 | 102.4 | 120.5 | 120.5 | 102.4 |
| 7 | 73.1 | 85.3 | 102.4 | 102.4 | 113.8 | 102.4 | 102.4 | 102.4 |

Fig. 9A

| ADD | A(m,n) | B(m,n) | S(m,n) |
|---|---|---|---|
| 0 | A(0,0) | B(0,0) | S(0,0) |
| 1 | A(1,0) | B(1,0) | S(1,0) |
| 2 | A(2,0) | B(2,0) | S(2,0) |
| 3 | A(3,0) | B(3,0) | S(3,0) |
| 4 | A(4,0) | B(4,0) | S(4,0) |
| 5 | A(5,0) | B(5,0) | S(5,0) |
| 6 | A(6,0) | B(6,0) | S(6,0) |
| 7 | A(7,0) | B(7,0) | S(7,0) |
| 8 | A(0,1) | B(0,1) | S(0,1) |
| 9 | A(1,1) | B(1,1) | S(1,1) |
| ⋮ | ⋮ | ⋮ | ⋮ |

Fig. 9B

| ADD | A(m,n) | B(m,n) | S(m,n) |
|---|---|---|---|
| 0 | A(0,0) | B(0,0) | S(0,0) |
| 1 | A(1,0) | B(1,0) | S(1,0) |
| 2 | A(0,1) | B(0,1) | S(0,1) |
| 3 | A(0,2) | B(0,2) | S(0,2) |
| 4 | A(1,1) | B(1,1) | S(1,1) |
| 5 | A(2,0) | B(2,0) | S(2,0) |
| 6 | A(3,0) | B(3,0) | S(3,0) |
| 7 | A(2,1) | B(2,1) | S(2,1) |
| 8 | A(1,2) | B(1,2) | S(1,2) |
| 9 | A(3,0) | B(3,0) | S(3,0) |
| ⋮ | ⋮ | ⋮ | ⋮ |

Fig. 12A

| A'(m,n) | | | | | | | | |
|---|---|---|---|---|---|---|---|---|
| n＼m | 0 | 1 | 2 | 3 | 4 | 5 | 6 | 7 |
| 0 | 0 | 1 | 1 | 0 | 2 | 1 | 2 | 4 |
| 1 | 2 | 2 | 3 | 3 | 2 | 3 | 4 | 3 |
| 2 | 3 | 2 | 0 | 2 | 1 | 3 | 4 | 3 |
| 3 | 3 | 4 | 1 | 3 | 2 | 1 | 1 | 5 |
| 4 | 3 | 1 | 3 | 3 | 4 | 3 | 2 | 3 |
| 5 | 2 | 4 | 3 | 0 | 1 | 2 | 3 | 1 |
| 6 | 2 | 0 | 3 | 1 | 2 | 4 | 4 | 2 |
| 7 | 3 | 1 | 2 | 2 | 3 | 2 | 2 | 2 |

Fig. 12B

| B'(m,n) | | | | | | | | |
|---|---|---|---|---|---|---|---|---|
| n＼m | 0 | 1 | 2 | 3 | 4 | 5 | 6 | 7 |
| 0 | 5 | 4 | 4 | 5 | 5 | 6 | 6 | 6 |
| 1 | 4 | 4 | 4 | 4 | 5 | 6 | 6 | 6 |
| 2 | 4 | 4 | 5 | 5 | 6 | 6 | 6 | 6 |
| 3 | 4 | 4 | 5 | 5 | 6 | 7 | 7 | 6 |
| 4 | 4 | 5 | 5 | 6 | 6 | 7 | 7 | 6 |
| 5 | 5 | 5 | 6 | 7 | 7 | 7 | 7 | 7 |
| 6 | 6 | 7 | 6 | 7 | 7 | 7 | 7 | 7 |
| 7 | 6 | 7 | 7 | 7 | 7 | 7 | 7 | 7 |

PICTURE SIGNAL PROCESSING SYSTEM HAVING IMPROVED QUANTIZER

BACKGROUND OF THE INVENTION

1. Field of the Invention

The present invention relates to a picture signal processing system, and more particularly, to the improvement of a quantizer in a data compression (encoder) portion of the picture signal processing system.

2. Description of the Related Art

Generally, in an encoder portion of a picture signal processing system, a transform coding using an orthogonal transformation is carried out. For example, picture signals are divided into sub-blocks, and an orthogonal transformation such as a discrete cosine transformation (DCT) is performed upon each of the sub-blocks, to thereby obtain transformed coefficients. Then, in a quantizer, a quantization is performed upon the transformed coefficients, to thereby obtain quantization coefficients. Finally, the quantization coefficients are encoded and are transmitted to the exterior.

In a prior art quantizer, each of the transformed coefficients is divided by its corresponding quantization factor to a frequency component thereof. For this purpose, a divider is provided, to thereby complicate and increase the configuration of the quantizer. Also, the speed of operation of the quantizer is low. This will be explained later in more detail.

In another prior art quantizer, quantization factors are approximated to values denoted by $2^k$ ($k=1, 2, \ldots$), and as a result, a single shifter is provided instead of the divider, thus simplifying and reducing the configuration of the quantizer. In this quantizer, the speed of operation is also increased (see: Japanese Patent Publication (Kokai) No. Hei 2-132972), which will explained later in more detail. In this prior art quantizer, however, when quantization factors are large, the interval therebetween is so large as to deteriorate the properties of a reproduced picture.

SUMMARY OF THE INVENTION

It is, therefore, an object of the present invention to simplify and reduce the configuration of a quantizer without deteriorating the properties of a reproduced picture in a picture signal processing system.

According to the present invention, a picture signal processing system includes an orthogonal transformer which performs an orthogonal transformation upon a group of picture signals to generate transformed coefficients G. A quantizer divides each of the transformed coefficients G by a quantization factor C determined by $$C = \frac{1}{(1 + S \cdot 2^A) \cdot 2^B}$$

where A and B are integers, and S is a sign. The quantizer generates a quantization coefficient G/C for each of the transformed coefficients G. Then, an encoder encodes each of the quantization coefficients G/C to generate compressed signals of the picture signals. Thus, in order to divide each of the transformed coefficients G by the quantization factor C, only two shifters are required, thus simplifying and reducing the configuration of the quantizer. Also, the intervals between larger quantization factors can be reduced, so that the properties of a reproduced picture are not deteriorated.

BRIEF DESCRIPTION OF THE DRAWINGS

The present invention will be more clearly understood from the description as set forth below, in comparison with the prior art, with reference to the accompanying drawings, wherein:

FIG. 6 is a block circuit diagram illustrating a first embodiment of the signal processing system according to the present invention;

FIG. 8A is a table showing the integers A stored in the look-up table of FIG. 6;

FIG. 8B is a table showing the integers B stored in the look-up table of FIG. 6;

FIG. 8C is a table showing the signs S stored in the look-up table of FIG. 6;

FIGS. 9A and 9B are tables showing the sequence of the integers A and B and the signs S with respect to the value of the address signal ADD in the look-up tables 61, 62 and 63 of FIG. 6;

FIG. 10 is a table showing the quantization factors C calculated in the quantizer of FIG. 6;

FIG. 12A is a table showing the integers A' stored in the look-up table of FIG. 11; and FIG. 12B is a table showing the integers B' stored in the look-up table of FIG. 11.

DESCRIPTION OF THE PREFERRED EMBODIMENTS

Before the description of embodiments of the present invention, a prior art picture signal processing system will be explained with reference to FIGS. 1, 2, 3 and 4.

Figure 1:
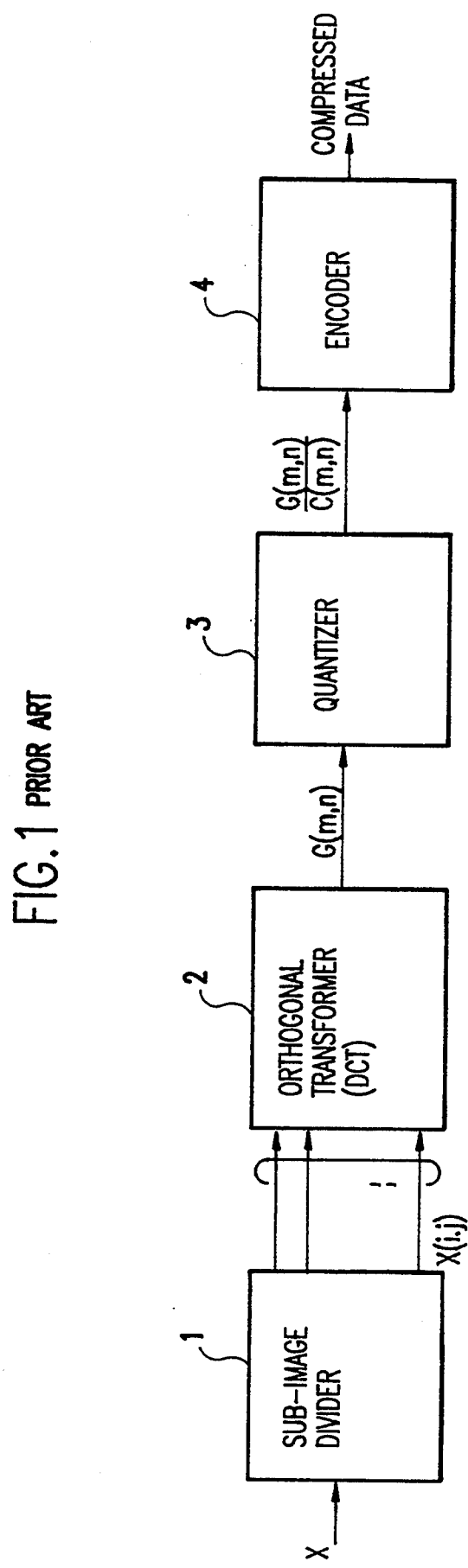
FIG. 1 is a block circuit diagram illustrating an encoder portion of a prior art signal processing system.

In FIG. 1, which illustrates an encoder portion of a prior art picture signal processing system, a sub-image divider 1 divides picture signals X into a group of N×N picture signals X (i, j) (i=0, 1, ..., N−1; j=0, 1, ..., N−1), which are supplied to an orthogonal transformer 2 which is, in this case, a DCT. This orthogonal transformer 2 performs a DCT upon each group of the picture signals X (i, j), to calculate the following transformed coefficients G (m, n):

$$G(m, n) = 2/N \, T(m) T(n) \sum_{i=0}^{N-1} \sum_{j=0}^{N-1} X(i, j) \times \cos\{(2i+1)/2N\} m\pi \times \cos\{(2j+1)/2N\} n\pi$$

where T (m), T (n) is $1/\sqrt{2}$ for m=0 (n=0) and is 1 otherwise.

The transformed coefficients G (m, n) (m=0, 1, ..., N−1; n=0, 1, ..., N−1) are supplied to a quantizer 3. In the quantizer 3, each of the transformed coefficients G (m, n) is divided by their corresponding quantization factors C (m, n), to generate quantization coefficients G (m, n)/C (m, n).

the quantization coefficients are encoded with an entropy code such as a Huffman code by an encoder 4 and are transmitted to the exterior.

Figure 2:
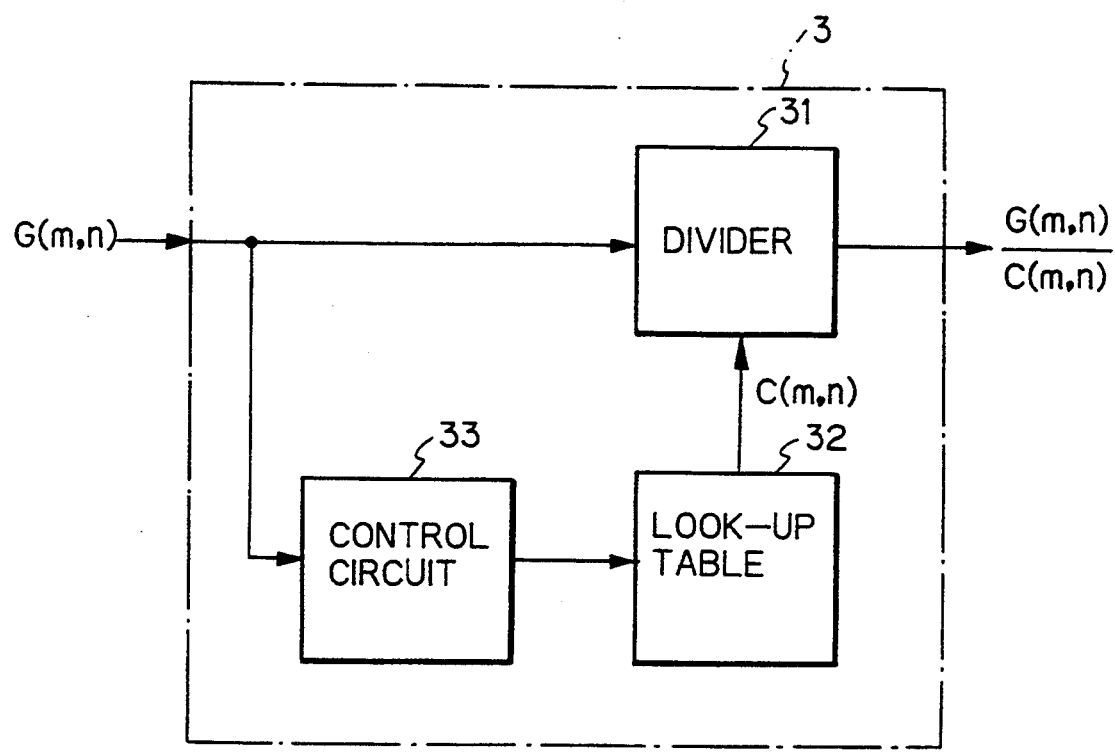
FIG. 2 is a block circuit of an example of the quantizer of FIG. 1.

In FIG. 2, which is a detailed block circuit of the quantizer 3 of FIG. 1, the quantizer 3 includes a divider 31 for dividing each of the transformed coefficients G (m, n) by their corresponding quantization factors C (m, n) which are stored in a look-up table 32. The read operation of the look-up table 32 is controlled by a control circuit 33 which also receives the transformed coefficients G (m, n).

Figures 3, 4:
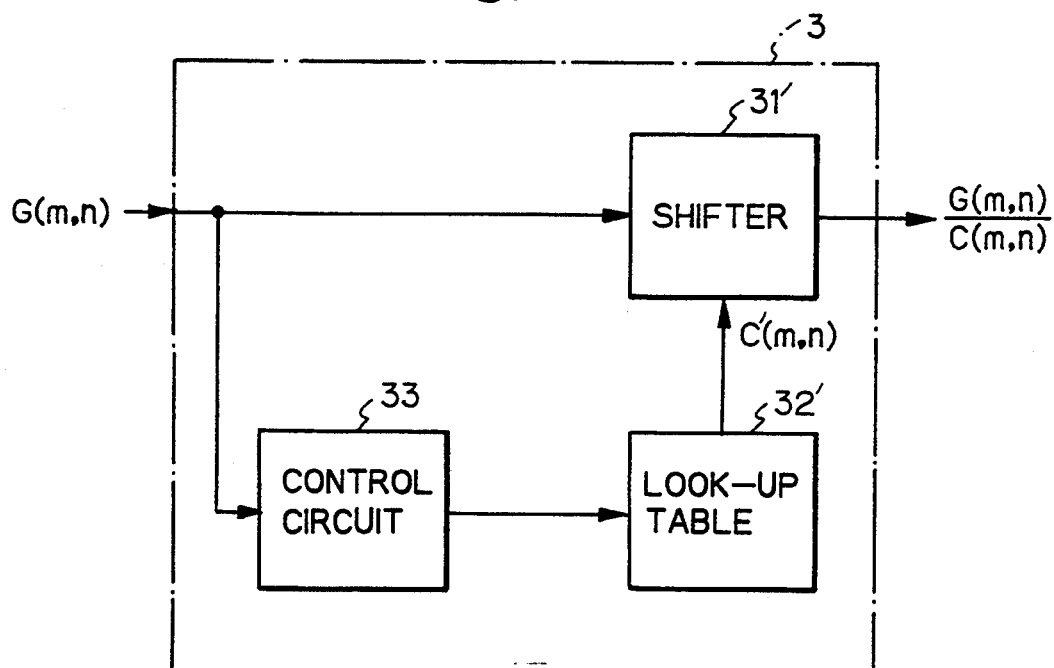
FIG. 3 is a table showing the quantization factors stored in the look-up table of FIG. 2.
FIG. 4 is a block circuit diagram of another example of the quantizer of FIG. 1.

If N=8, an example of the quantization factors C (m, n) (m=0, 1, ..., 7; n=0, 1, ... 7) is shown in FIG. 3. That is, in a low frequency region where the values m and n are relatively small, the quantization factors C (m, n) are small. Conversely, in a high frequency region where the values m and n are relatively large, the quantization factors C (m, n) are large. Note that optimum quantization factors C (m, n) are determined so as to satisfy the human visual sensitivity.

In the quantizer 3 of FIG. 2, however, the divider 31, i.e., the quantizer 3 is complex and large in scale. Also, the speed of operation of the divider 31, i.e., the quantizer 3 is small.

In FIG. 4, another example of the quantizer 3 is illustrated (see: the above-mentioned Kokai No. Hei 2-132972). This quantizer 3 includes a shifter 31' instead of the divider 31 of FIG. 2. The shifter 31 shifts each of the transformed coefficients G (m, n) in the right direction by a number of bits corresponding to factors C' (m, n) which are stored in a look-up table 32'.

Figures 5, 7:
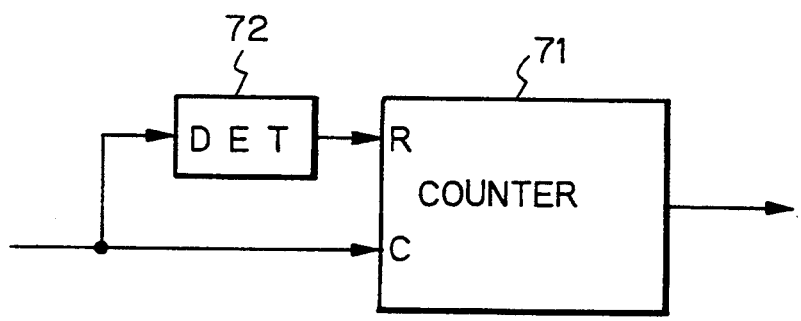
FIG. 5 is a table showing the factors stored in the look-up table of FIG. 4.
FIG. 7 is a block circuit diagram of a modification of the N×N-ary counter of FIG. 6.

If N=8, an example of the factors C' (m, n) (m=0, 1, ..., 7; n=0, 1, ..., 7) is shown in FIG. 5. That is, in this case, in a low frequency region where the values m and n are relatively small, the factors C' (m, n) are small. Conversely, in a high frequency region where the values m and n are relatively large, the factors C' (m, n) are large.

In the quantizer 3 of FIG. 4, however, the quantization factors C (m, n) derived from the factors C' (m, n) are coarse and accordingly, are not optimum in view of the human visual sensitivity. Also, when the quantization factors are large, the interval therebetween is very large. For example, if the values of the factors C' (m, n) are 6 and 7, the values of the corresponding quantization factors C (m, n) are 64 (=$2^6$) and 128 (=$2^7$), so that the interval therebetween is 64. This deteriorates the properties of a reproduced picture.

In the present invention, the quantization factors C (m, n) are approximated by $$C(m, n) = \frac{1}{(1 + S(m, n) \cdot 2^{A(m,n)} \cdot 2^{B(m,n)})}$$

where A (m, n) and B (m, n) are integers and S (m, n) is a sign. Therefore, a quantizer according to the present invention calculates the quantization coefficients as follows:

$$G(m, n)/C(m, n) = G(m, n) \cdot (1+S)(m, n) \cdot 2^{A(m, n)} \cdot 2^{B(m, n)} \quad (1)$$

In FIG. 6, which illustrates a first embodiment of the present invention, a quantizer 3' includes three look-up tables 61, 62 and 63 for storing the integers A (m, n), B (m, n) and the signs S (m, n), which tables are formed by random access memories (RAM's) or read only memories (ROM's). The look-up tables 61, 62 and 63 are accessed by an N×N-ary counter 64 which is a 64-ary counter if N is 8. That is, the counter 64 counts the transformed coefficients G (m, n) (m=0, 1, ... 7; n=0, 1, ..., 7) to generate an address signal ADD. Note that the counter 64 is initially reset by an appropriate means.

Also, the counter 64 can be formed by a conventional counter 71 capable of counting a large number, and a detector 72, as illustrated in FIG. 7. In FIG. 7, when the detector 72 detects a header interposed in every 64 transformed coefficients G (m, n), the detector 72 resets the counter 71. Therefore, the circuit of FIG. 7 can serve as the 64-ary counter 64.

If N=8, an example of the integers A (m, n) (M=0, 1, ... 7; n=0, 1, ... 7) is shown in FIG. 8A; an example of the integers B (m, n) (m=0, 1, ..., 7; n=0, 1, ... 7) is shown in FIG. 8B; and an example of the signs S (m, n) (M=0, 1, ... 7; n=0, 1, ..., 7) is shown in FIG. 8C. The sequence of the integers A (m, n) and B (m, n) and the signs S (m, n) with respect to the value of the address signal ADD is coincided with that of the transformed coefficients G (m, n). For example, if the sequence of the transformed coefficients G (m, n) are G (0, 0), G (1, 0), G (2, 0), ..., G (7, 0), G (0, 1), G (1, 1), ..., G (7, 1), ..., G (0, 7), G (1, 7), ..., G (7, 7), the sequence of the integers A (m, n) are A (0, 0), A (1, 0), A (2, 0), ..., A (7, 0), A (0, 1), A (1, 1), ..., A (7, 1), ..., A (0, 7), A (1, 7), ..., A (7, 7); the sequence of the integers B (m, n) are B (0, 0), B (1, 0), B (2, 0), ..., B (7, 0), B (0, 1), B (1, 1), ..., B (7, 1), ..., B (0, 7), B (1, 7), ..., B (7, 7); and the sequence of the signs S (m, n) are S (0, 0), S (1, 0), S (2, 0), ..., S (7, 0), S (0, 1), S (1, 1), ..., S (7, 1), ..., S (0, 7), S (1, 7), ..., S (7, 7), as shown in FIG. 9A. Similarly, if the sequence of the transformed coefficients G (m, n) are G (0, 0), G (1, 0), G (0, 1), G (0, 2), G (1, 1), G (2, 0), G (3, 0), G (2, 1), G (1, 2), G (3, 0), ... in a zigzag mode, the sequence of the integers A (m, n) are A (0, 0), A (1, 0), A (0, 1), A (0, 2), A (1, 1), A (2, 0), A (3, 0), A (2, 1), A (1, 2), A (3, 0), ...; the sequence of the integers B (m, n) are B (0, 0), B (1, 0), B (0, 1), B (0, 2), B (1, 1), B (2, 0), B (3,0), B *2, 1), B (1, 2), ..., B (3, 0), ...; and the sequence of the signs S (m,n) are S (0, 0), S (1, 0) S (0, 1), S (0, 2), S (1, 1), S (2, 0), S (3, 0), S (2, 1), S (1, 2), S (3, 0), ... as shown in FIG. 9B.

Returning to FIG. 6, a shifter 65 receives the integer A (m, n) read from the look-up table 61, to thereby shift the transformed coefficient G (m, n) by the integer A (m, n). In this case, if A (m, n)>0, the shifter 65 serves as a left directional arithmetic shifter, while, if A (m, n)<0, the shifter 65 serves as a right directional arithmetic shifter. Also, if A (m, n)=0, the shifter 65 passes the transformed coefficient G (m, n) therethrough. The shifter 65 can be formed by a barrel shifter. Therefore, the shifter 65 calculates:

$$G(m, n) \cdot 2^{A(m, n)} \quad (2)$$

An adder 66 adds the output of the shifter 65 to the transformed coefficient G (m, n), i.e., calculates:

$$G(m, n) + G(m, n) \cdot 2^{A(m, n)} = G(m, n) \cdot (1 + 2^{A(m, n)}) \quad (3)$$

Also, a subtractor 67 subtracts the output of the shifter 65 from the transformed coefficient G (m, n), i.e., calculates:

$$G(m, n) - G(m, n) \cdot 2^{A(m, n)} = G(m, n) \cdot (1 - 2^{A(m, n)}) \quad (4)$$

Further, a selector 68 receives the sign S (m, n) read from the look-up table 63, to thereby select one output of the adder 66 and the subtractor 67. If S (m, n)=+, the selector 68 selects the output of the adder 66, while, if S (m, n)=−, the selector 68 selects the output of the subtractor 67. That is, the output of the selector 68 is $$G(m, n) \cdot (1 + S(m, n) \cdot 2^{A(m, n)}) \quad (5)$$

A shifter 69 receives the integer B (m, n) read from the look-up table 62, to thereby shift the transformed coefficient G (m, n) by the integer B (m, n). Also, in this case, if B (m, n)>0, the shifter 69 serves as a left directional arithmetic shifter, while, if B (m, n)<0, the shifter 69 serves as a right directional arithmetic shifter. Also, if B (m, n)=0, the shifter 69 passes the output of the selector 69 therethrough. The shifter 69 can be also formed by a barrel shifter. Therefore, the shifter 69 calculates:

$$G(m, n) \cdot (1 + S(m, n) \cdot 2^{A(m, n)}) \cdot 2^{B(m, n)} \quad (6)$$

The formular (6) coincides with the formula (1).

In FIG. 6, the quantization factor C (m, n) is represented by $$C(m, n) = \frac{1}{(1 + S(m, n) \cdot 2^{A(m,n)}) \cdot 2^{B(m,n)}} \quad (7)$$

When the integers A (m, n) and B (m, n) and the signs S (m, n) as shown in FIGS. 8A, 8B and 8C are used to calculate the quantization factors C (m, n) by the formula (7), the quantization factors C (m, n) as shown in FIG. 10 are obtained. As can be seen in FIGS. 3 and 10, the quantization factors C (m, n) as shown in FIG. 10 are substantially the same as those as shown in FIG. 3 which are optimum in view of the human visual sensitivity.

Figure 11:
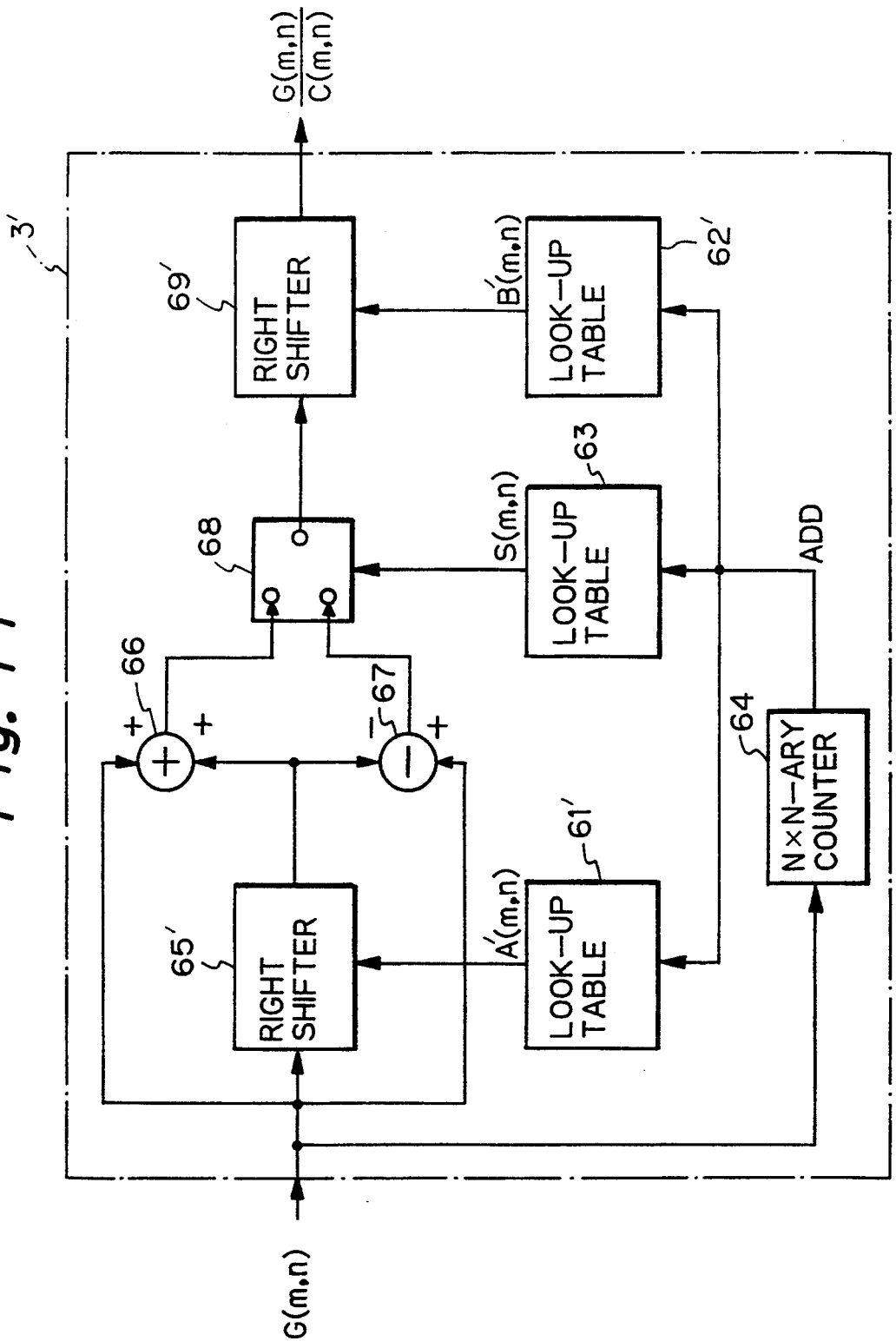
FIG. 11 is a block circuit diagram illustrating a second embodiment of the signal processing system according to the present invention.

In FIG. 11, which illustrates a second embodiment of the present invention, look-up tables 61' and 62' and right directional arithmetic shifters, i.e., right shifters 65' and 69' are provided instead of the look-up tables 61 and 62 and the shifter 65 and 69, respectively, of FIG. 6. That is, in FIG. 6, the contents of the look-up tables 61 and 62 are not positive, and therefore, the shifters 65 and 69 serve as only right direction arithmetic shifters. Therefore, in FIG. 11, the shifters 65' and 69' have only a right directional arithmetic shifting function, and the contents of the look-up tables 61' and 62' are not negative as shown in FIGS. 12A and 12B, respectively. Thus, the hardware of the quantizer 3' of FIG. 11 is reduced as compared with that of FIG. 6.

As explained hereinbefore, according to the present invention, the configuration of the quantizer, i.e., the picture processing system can be simplified and reduced in size, without deteriorating the properties of a reproduced picture. Also, the speed of operation of the quantizer, i.e., the picture processing system can be increased.

I claim:

1. A picture signal processing system comprising:
    an orthogonal transformer for performing an orthogonal transformation upon a group of picture signals to generate transformed coefficients G;
    a quantizer, connected to said orthogonal transformer, for dividing each of the transformed coefficients G by a quantization factor C determined by $$C = \frac{1}{(1 + S \cdot 2^A) \cdot 2^B}$$

where A and B are integers, and S is a sign, said quantizer generating a quantization coefficient G/C for each of the transformed coefficients G;
    an encoder connected to said quantizer, for encoding each of the quantization coefficients G/C to generate compressed signals of the picture signals.

2. A system as set forth in claim 1, wherein said quantizer comprises:
    a first memory means for storing the integers A in accordance with frequency components of the transformed coefficients G;
    a second memory means for storing the integers B in accordance with the frequency components of the transformed coefficients G;
    a third memory means for storing the signs S in accordance with the frequency components of the transformed coefficients G;
    a reading means, connected to said orthogonal transformer, and to said first, second and third memory means, for generating an address signal by counting the transformed coefficients G and reading said first and second memory means by the address signal;
    a first shifter, connected to said orthogonal transformer and to said first memory means, for shifting each of the transformed coefficients G by a number of bits corresponding to the integer A read from said first memory means;
    a calculating means, connected to said orthogonal transformer, to said first shifter, and to said third memory means, for performing a calculating between each of the transformed coefficients G and the output of said first shifter in accordance with the sign S read from said third memory means; and
    a second shifter, connected to said calculating means, for shifting the output of said calculating means by a number of bits corresponding to the integer B read from said second memory means.

3. A system as set forth in claim 2, wherein said calculating means comprises:
    an adder, connected to said orthogonal transformer and to said first shifter, for adding the output of said first shifter to each of the transformed coefficients G;
    a subtractor, connected to said orthogonal transformer and to said first shifter, for subtracting the output of said first shifter from each of the transformed coefficients G; and
    a selector, connected to said adder, to said subtractor, and to said third memory means, for selecting one of the outputs of said adder and said subtractor in accordance with the sign S read from said third memory means.

4. A system as set forth in claim 1, wherein said orthogonal transformer comprises a discrete cosine transformer (DCT).

5. A system as set forth in claim 2, wherein the group of picture signals include N×N, wherein N is an integer (N=2, 3, ...) picture signals, said reading means comprising an N×N-ary counter.

6. A picture signal processing system comprising:

an orthogonal transformer for performing an orthogonal transformation upon a group of picture signals to generate transformed coefficients G;

a first memory means for storing non-negative integers A' in accordance with frequency components of the transformed coefficients G;

a second memory means for storing non-negative integers B' in accordance with the frequency components of the transformed coefficients G;

a third memory means for storing signs S in accordance with the frequency components of the transformed coefficients G;

a counter, connected to said orthogonal transformer, and to said first, second and third memory means for generating an address signal by counting the transformed coefficients G and reading said first and second memory means by the address signal, said counter being reset by every group of the transformed coefficients;

a first right shifter, connected to said orthogonal transformer and to said first memory means, for shifting each of the transformed coefficients G in the right direction by a number of bits corresponding to the integer A' read from said first memory means;

an adder, connected to said orthogonal transformer and to said first shifter, for adding the output of said first shifter to each of the transformed coefficients G;

a subtractor, connected to said orthogonal transformer and to said first shifter, for subtracting the output of said first shifter from each of the transformed coefficients G;

a selector, connected to said adder, to said subtractor, and to said third memory means, for selecting one of the outputs of said adder and said subtractor in accordance with the sign S read from said third memory means; and a second right shifter, connected to said selector, for shifting the output of said selector on the right direction by a number of bits corresponding to the integer B' read from said second memory means.

7. A system as set forth in claim 6, wherein said orthogonal transformer comprises a discrete cosine transformer (DCT).

8. A system as set forth in claim 6, where the group of picture signals include $N \times N$, wherein N is an integer ($N=2, 3, \ldots$) picture signals, said counter comprising an $N \times N$-ary counter.

* * * * *